United States Patent
Hisada et al.

(10) Patent No.: US 7,357,204 B2
(45) Date of Patent: Apr. 15, 2008

(54) DRIVE-CONTROL SYSTEM OF ELECTROMOTIVE VEHICLE AND DRIVE-CONTROL-METHOD OF ELECTROMOTIVE VEHICLE

(75) Inventors: Hideki Hisada, Aichi-ken (JP); Kazuo Aoki, Aichi-ken (JP); Kazuma Hasegawa, Aichi-ken (JP)

(73) Assignee: Aisin AW Co., Ltd., Aichi-ken (JP)

( * ) Notice: Subject to any disclaimer, the term of this patent is extended or adjusted under 35 U.S.C. 154(b) by 460 days.

(21) Appl. No.: 11/047,776

(22) Filed: Feb. 2, 2005

(65) Prior Publication Data

US 2005/0167170 A1 Aug. 4, 2005

(30) Foreign Application Priority Data

Feb. 2, 2004 (JP) ............................. 2004-025728

(51) Int. Cl.
*B60L 9/00* (2006.01)

(52) U.S. Cl. .............. 180/65.2; 180/65.8; 180/381; 180/65.1; 701/22; 701/54; 701/61; 701/104

(58) Field of Classification Search .............. 180/65.2, 180/65.1, 65.8, 381; 123/198; 318/34; 701/1–22, 701/54, 61, 104
See application file for complete search history.

(56) References Cited

U.S. PATENT DOCUMENTS

| | | | |
|---|---|---|---|
| 4,770,438 A * | 9/1988 | Sugasawa et al. | 280/5.518 |
| 5,425,335 A * | 6/1995 | Miyamoto et al. | 123/198 F |
| 6,408,968 B1 * | 6/2002 | Wakashiro et al. | 180/65.3 |
| 6,621,244 B1 * | 9/2003 | Kiyomiya et al. | 318/611 |
| 6,722,456 B2 | 4/2004 | Hisada | |
| 6,840,341 B2 * | 1/2005 | Fujikawa | 180/65.2 |
| 6,898,501 B2 * | 5/2005 | Schubert | 701/50 |
| 6,960,152 B2 | 11/2005 | Aoki et al. | |
| 7,023,150 B2 * | 4/2006 | Hisada et al. | 318/34 |

FOREIGN PATENT DOCUMENTS

| | | |
|---|---|---|
| JP | 2002-012046 A | 1/2002 |
| JP | 2003-111213 A | 4/2003 |

* cited by examiner

*Primary Examiner*—Paul N. Dickson
*Assistant Examiner*—Cynthia F. Collado
(74) *Attorney, Agent, or Firm*—Sughrue Mion, PLLC

(57) ABSTRACT

A drive-control-system of electromotive vehicle and drive-control-method of an electromotive vehicle. A system has a condition-determination-process unit that reads a vibration index as a factor causing vibration in the vehicle-drive-system, and determines whether a damping-control-starting-condition is established based on the vibration index, and a damping-control-process unit that performs a damping control process such that a variable of vibration generation is reduced when the damping-control-starting-condition is established.

14 Claims, 10 Drawing Sheets

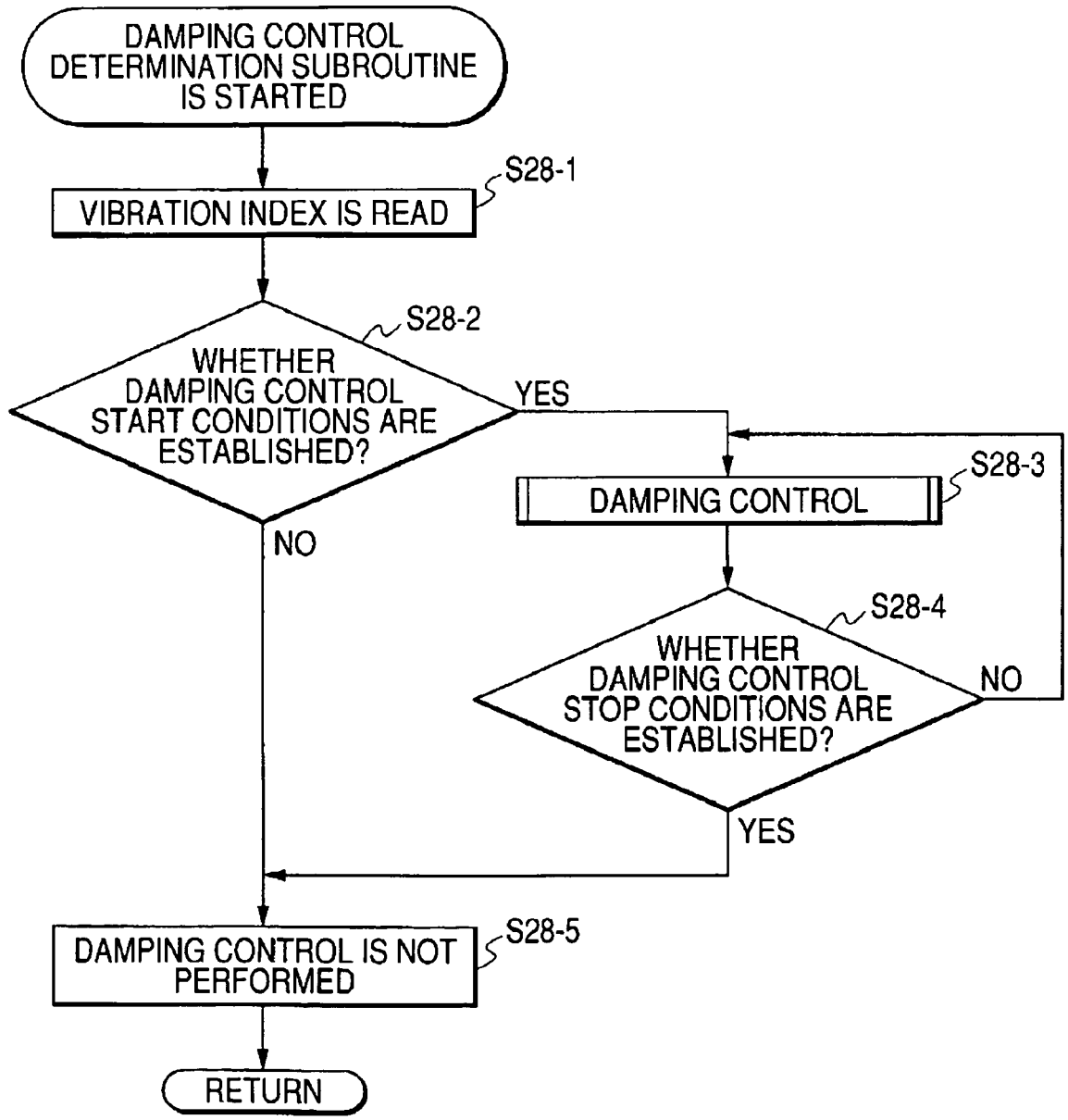

DRIVE-CONTROL SYSTEM OF ELECTROMOTIVE VEHICLE AND DRIVE-CONTROL-METHOD OF ELECTROMOTIVE VEHICLE

BACKGROUND OF THE INVENTION

This application claims the priority of Japanese Patent Application No. 2004-025728 filed on Feb. 2, 2004, the specification, drawings and abstract thereof, are incorporated herein by reference in their entirety.

1. Field of the Invention

The present invention relates to a drive-control-system of an electromotive vehicle and a drive-control-method of the electromotive vehicle.

2. Description of the Related Art

Conventionally, a vehicle-drive-system mounted on a hybrid vehicle such as an electromotive vehicle, in which a part of engine-torque, that is torque of an engine is transmitted to a generator (generator motor) and the rest of the engine torque is transmitted to a driving wheel, has a planetary gear unit as a differential tuning gear having a sun gear, ring gear, and carrier. The sun gear is linked with the generator, the ring gear and a driving motor are linked with the driving wheel, the carrier is linked with the engine, and rotation outputted from the ring gear and the driving motor is transmitted to the driving wheel to generate driving force.

In the vehicle-drive-system, an inverter is arranged between the driving motor and a driving-motor-control-system. The inverter, which is driven according to a driving signal sent from the driving-motor-control-system, receives DC electric current from a battery, generates electric current in U phase, V phase and W phase, and provides the electric current in each phase to the driving motor. Thus, the inverter has a plurality of, for example, six transistors, as switching elements. The transistors are unitized by pairs to form transistor modules, Insulated Gate Bipolar Transistor (IGBT), in respective phases. Therefore, when the driving signal is sent to each of the transistors in a predetermined pattern, the transistor is turned on and off, and generates the electric current in each phase.

Driving-motor-rotation-speed, which is a rotation speed of the driving motor, is detected by a driving-motor-rotation-speed sensor, and for example, driving-motor-torque, that is torque of the driving motor, is controlled based on the driving-motor-rotation-speed.

However, in the conventional vehicle-drive-system, (JP-A-2002-12046), for example, when driving torque generated in the driving wheel for running the hybrid vehicle varies, or the engine is started or stopped, vibration is generated in the vehicle-drive-system, resulting in discomfort to a driver. Therefore, damping control is performed, wherein driving-motor-torque of the driving motor is controlled such that the vibration in the vehicle-driving-system is damped. However, when the driving-motor-torque is controlled such that the vibration in the vehicle-driving-system is damped at any time, especially in steady running, high-frequency vibration is generated in a sensor output from a position sensor for detecting a rotor position of the driving motor due to noise, resulting in discomfort to the driver.

Thus, to suppress the high-frequency vibration generated simply due to the noise in the sensor output from the position sensor, it is determined that response in the damping control is lowered by reducing control gain in the damping control, removing the noise by passing the sensor output from the position sensor through a filter, or performing blunting to the sensor output. However, in this case, for example, when the driving torque varies, or the engine is started or stopped, the vibration generated in the vehicle-drive-system can not be quickly damped, resulting in discomfort to the driver.

SUMMARY OF THE INVENTION

The exemplary embodiment of the present invention addresses the problems of the conventional vehicle-drive-system, and provides a drive-control-system of the electromotive vehicle and a drive-control-method of the electromotive vehicle that can damp the vibration generated in the vehicle-drive-system, and can prevent discomfort to the driver.

For this purpose, the drive-control-system of the electromotive vehicle of an exemplary embodiment of the invention has a condition-determination-process unit that reads a vibration index as a factor causing the vibration in the vehicle-drive-system, and determines whether a damping-control-starting-condition is established based on the vibration index; and a damping-control-process unit that performs the damping-control-process such that a variable of vibration generation is reduced when the damping-control-starting-condition is established.

Furthermore, in another drive-control-system of the electromotive vehicle of an exemplary embodiment of the invention, the damping-control-process unit has a vibration-generation-variable calculation-process unit that calculates the variable of the vibration generation appearing with the vibration generated in the vehicle-drive-system, and performs the damping-control-process based on the variable of the vibration generation calculated by the vibration-generation-variable calculation-process unit.

Furthermore, in still another drive-control-system of the electromotive vehicle of an exemplary embodiment of the invention, the vehicle-drive-system has a driving motor mechanically linked with the driving wheel.

The damping-control-process unit reduces the variable of the vibration generation by controlling the driving motor.

Furthermore, in still another drive-control-system of the electromotive vehicle of an exemplary embodiment of the invention, the damping-control-process unit prohibits the damping-control-process when the starting condition of the damping control is not established.

Furthermore, in still another drive-control-system of the electromotive vehicle of an exemplary embodiment of the invention, the vibration index is a variation of input torque or output torque in the vehicle-drive-system, or a predetermined instruction causing the variation.

Furthermore, in still another drive-control-system of the electromotive vehicle of an exemplary embodiment of the invention, the vibration index is an instruction for engaging or disengaging a generator brake.

Furthermore, in still another drive-control-system of the electromotive vehicle of an exemplary embodiment of the invention, the vibration index is an instruction for turning auxiliary equipment on or off.

Furthermore, in still another drive-control-system of the electromotive vehicle of an exemplary embodiment of the invention, the vibration index is a predetermined percentage of change of rotation speed of a driving source.

Furthermore, in still another drive-control-system of the electromotive vehicle of an exemplary embodiment of the invention, the vibration index is a percentage of change of an operation level of a driver for accelerating or decelerating a vehicle.

Furthermore, in still another drive-control-system of the electromotive vehicle of an exemplary embodiment of the invention, the variable of the vibration generation is angular acceleration of the driving motor.

Furthermore, still another drive-control-system of the electromotive vehicle of an exemplary embodiment of the invention has the generator, driving motor, and a differential tuning gear. The differential tuning gear has a first differential element linked with the generator, a second differential element linked with the driving motor, and a third differential element linked with the engine.

Furthermore, still another drive-control-system of the electromotive vehicle of an exemplary embodiment of the invention has a driving-motor-target-torque calculation-process unit that estimates drive-shaft-torque when the generator is driven based on generator-target-torque and inertia torque of the generator, and calculates the driving-motor-target-torque based on vehicle-request-torque required for running the vehicle and the drive-shaft-torque.

The driving-motor-target-torque calculation-process unit estimates the drive-shaft-torque based on inertia torque of the driving motor calculated based on the generator-target-torque, the inertia torque of the generator, and the angular acceleration.

The drive-control-method of the electromotive vehicle of the invention reads the vibration index as the factor causing the vibration in the vehicle-drive-system, determines whether the damping-control-starting-condition is established based on the vibration index, and when the damping-control-starting-condition is established, performs the damping-control-process such that the variable of the vibration generation is reduced.

Consistent with an exemplary embodiment of the invention, the drive-control-system of the electromotive vehicle has the condition-determination-process unit that reads the vibration index as the factor causing the vibration in the vehicle-drive-system, and determines whether the damping-control-starting-condition is established based on the vibration index and the damping-control-process unit that performs the damping-control-process such that the variable of the vibration generation is reduced when the damping-control-starting-condition is established.

In this case, since the damping-control-process is performed such that the variable of the vibration generation is reduced when the damping-control-starting-condition is established, the vibration generated in the vehicle-drive-system can be quickly damped, and the discomfort to the driver can be prevented.

BRIEF DESCRIPTION OF THE DRAWINGS

and FIG. 15 is a diagram showing a subroutine of the damping-control-determination-process consistent with an exemplary embodiment of the invention.

DESCRIPTION OF THE EXEMPLARY EMBODIMENTS

Hereinafter, an exemplary embodiment of the invention is described in detail with reference to drawings. In this case, a hybrid vehicle as an electromotive vehicle is described.

Figure 1:
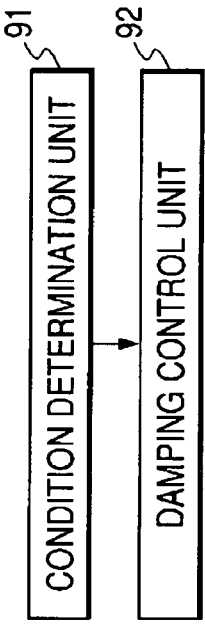
FIG. 1 is a functional block diagram of a drive-control-system of an electromotive vehicle consistent with an exemplary embodiment of the invention.

FIG. 1 is a functional block diagram of a drive-control-system of the electromotive vehicle consistent with an exemplary embodiment of the invention.

In FIG. 1, condition-determination-process unit 91 reads a vibration index as a factor causing vibration in the vehicle-drive-system, and determines whether the damping-control-starting-condition is established based on the vibration index. Damping-control-process unit 92 performs the damping-control-process such that the variable of the vibration generation is reduced when the damping-control-starting-condition is established.

Figure 2:
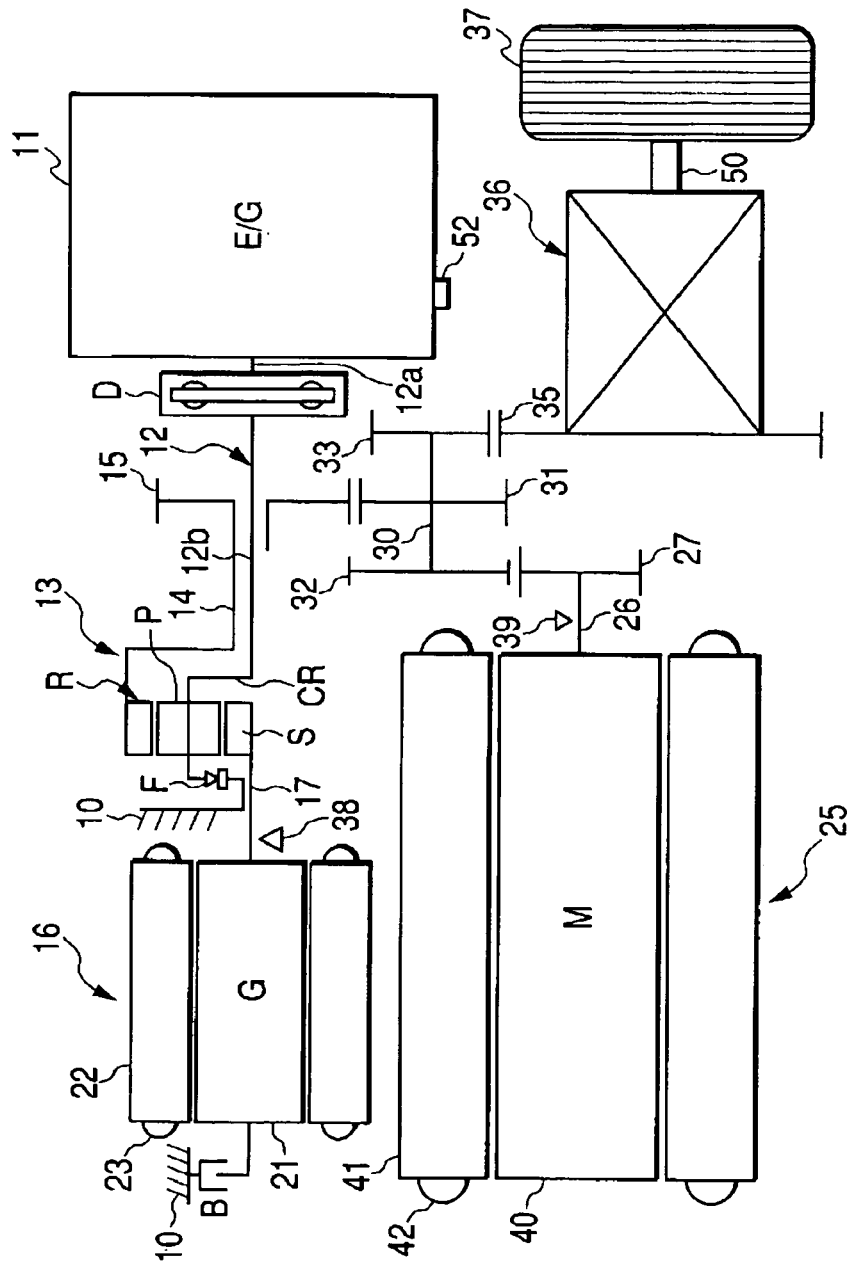
FIG. 2 is a conceptual diagram of a hybrid vehicle consistent with an exemplary embodiment of the invention.

Next, the hybrid vehicle is described. FIG. 2 is a conceptual diagram of the hybrid vehicle consistent with an exemplary embodiment of the invention.

In FIG. 2, engine (E/G) 11 is a driving source arranged on a first axis. An output shaft 12 is arranged on the first axis and outputs rotation generated by driving the engine 11. A planetary gear unit 13 is a differential tuning gear that is arranged on the first axis and performs gear change for rotation inputted via the output shaft 12. The rotation after the gear change in the planetary gear unit 13 is outputted to an output shaft 14 arranged on the first axis. A first counter drive gear 15 is an output gear fixed to the output shaft 14. Generator (G) 16 is a driving source that is arranged on the first axis, linked with the planetary gear unit 13 via a transmission shaft 17, and linked with the engine 11 in a differentially-rotatable and mechanical manner, and as a first electromotive machine. The generator 16 is also linked mechanically with a driving wheel 37.

A damper D is arranged on the output shaft 12. The damper D is connected between an input 12a at a side of the engine 11 in the output shaft 12 and an output 12b at a side of the planetary gear unit 13, and has a drive member, not shown, mounted on the input 12a, a driven member, not shown, mounted on the output 12b, and a spring, not shown, as a biasing member arranged between the drive member and the driven member. Engine torque TE transmitted to the drive member via the input 12a is transmitted to the spring, and a sudden change is absorbed in the spring, and then the torque is transmitted to the driven member, and outputted to the output 12b.

The output shaft 14 has a sleeve-like shape, and is arranged encircling the output shaft 12. The first counter drive gear 15 is arranged at a side near the engine 11 with respect to the planetary gear unit 13.

The planetary gear unit 13 has at least a sun gear S as a first differential element, a pinion P meshing with the sun gear S, a ring gear R as a second differential element meshing with the pinion P, and a carrier CR as a third differential element that rotatably supports the pinion P. The sun gear S is linked with the generator 16 via the transmission shaft 17. The ring gear R, which is arranged on a second axis parallel to the first axis, is linked with the engine 11 and the generator 16 in a differentially rotatable manner, and linked with a driving motor (M) 25 as a mechanically linked drive-source and as a second electromotive machine, and linked with a driving wheel 37, via the output shaft 14 and a fixed gear array.

The carrier CR is linked with the engine 11 via an output shaft 12. The driving motor 25 is mechanically linked with the driving wheel 37. A one-way clutch F is arranged between the carrier CR and a case 10 of the vehicle-drive-system. The one-way clutch F becomes free when forward rotation is transmitted from the engine 11 to the carrier CR, and is locked when reverse rotation is transmitted from the generator 16 or the driving motor 25 to the carrier CR, and thereby stops rotation of the engine 11 so that the reverse rotation is not transmitted to the engine 11. Therefore, if the generator 16 is driven in a condition that driving of the engine 11 has been stopped, the one-way clutch F applies reaction force against the torque transmitted from the generator 16. Instead of the one-way clutch F, a brake, not shown, as a stopping unit can be arranged between the carrier CR and the case 10.

The generator 16 comprises a rotor 21 which is fixed to the transmission shaft 17 and arranged rotatably, a stator 22 arranged around the rotor 21, and a coil 23 wound around the stator 22, and generates power by rotation transmitted via the transmission shaft 17. Therefore, the coil 23 is connected to a battery, not shown, and supplies DC electric current to the battery. A generator brake B is arranged between the rotor 21 and the case 10, and the rotor 21 is fixed by engaging the generator brake B therewith, thereby rotation of the generator 16 can be mechanically stopped.

An output shaft 26 is arranged on the second axis, to which the rotation of the driving motor 25 is outputted. Second counter gear 27 is an output gear fixed to the output shaft 26. The driving motor 25 is fixed to the output shaft 26, and comprises a rotor 40 which is arranged rotatably, a stator 41 arranged around the rotor 40, and a coil 42 wound around the stator 41.

The driving motor 25 generates driving-motor-torque TM using electric current in U phase, V phase and W phase that is AC electric current supplied to the coil 42. Therefore, the coil 42 is connected to the battery, and DC electric current from the battery is converted into the electric current in each phase and then supplied to the coil 42.

To rotate the driving wheel 37 in the same direction as the rotation of the engine 11, a counter shaft 30 is arranged on a third axis parallel to the first and second axes, and a first counter driven gear 31 and a second counter driven gear 32 having a larger number of teeth than the first counter driven gear 31 are fixed to the counter shaft 30. The first counter driven gear 31 is meshed with the first counter drive gear 15, and the second counter driven gear 32 is meshed with the second counter drive gear 27, so that rotation of the first counter drive gear 15 is inverted and transmitted to the first counter driven gear 31, and rotation of the second counter drive gear 27 is inverted and transmitted to the second counter driven gear 32.

Furthermore, the counter shaft 30 is fixed with a differential pinion gear 33 having smaller number of teeth than the first counter driven gear 31.

A differential device 36 is arranged on a fourth axis parallel to the first to third axes, and a differential ring gear 35 of the differential device 36 is meshed with the differential pinion gear 33. Therefore, the rotation transmitted to the differential ring gear 35 is distributed by the differential device 36, and transmitted to the driving wheel 37.

In this way, since the rotation generated by the engine 11 can be transmitted to the first counter driven gear 31, in addition, the rotation generated by the driving motor 25 can be transmitted to the second counter driven gear 32, the engine 11 and the driving motor 25 are driven, thereby the hybrid vehicle can be run.

In the hybrid vehicle configured as above, when a shift lever, not shown, as a gearshift member is operated, and a predetermined range is selected from a forward range, backward range, neutral range, and parking range, a shift-position-discrimination-device, not shown, discriminates the selected range, and generates a range position signal and sends the signal to a vehicle-control-system.

Position sensor 38, such as a resolver, is a first rotor position detecting-element which detects a rotor position $\theta G$ that is a position of the rotor 21, and position sensor 39 such as a resolver, is a second rotor position detecting-element which detects a rotor position $\theta M$ that is a position of the rotor 40. The detected rotor position $\theta G$ is sent to the vehicle-control-system, not shown, and a generator-control-system, not shown, and the rotor position $\theta M$ is sent to the vehicle-control-system, not shown, and a driving-motor-control-system, not shown. Driving shaft 50 is an output shaft of the differential device 36, and engine-rotation-speed sensor 52 is a detecting element that detects rotation speed of the engine NE, and the detected engine-rotation-speed NE is sent to the vehicle-control-system and the engine-control-system, not shown. The engine 11, planetary gear unit 13, generator 16, driving motor 25, counter shaft 30, and differential device 36 form the vehicle drive system.

Figure 3:
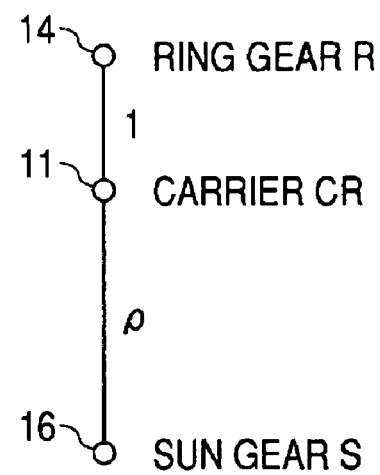
FIG. 3 is a diagram for explaining operation of a planetary gear unit consistent with an exemplary embodiment of the invention.
Figure 4:
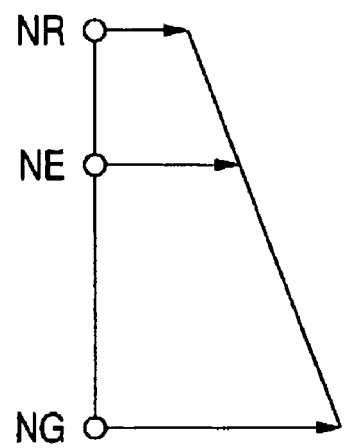
FIG. 4 is a car speed diagram in normal running of the hybrid vehicle consistent with an exemplary embodiment of the invention.
Figure 5:
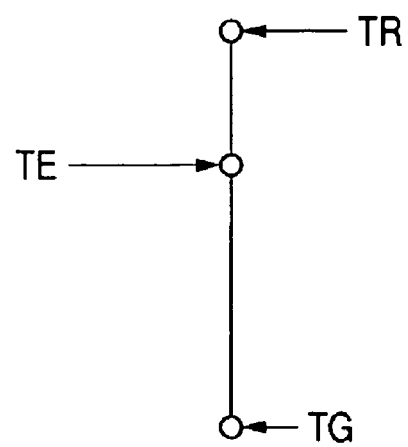
FIG. 5 is a torque diagram in the normal running of the hybrid vehicle consistent with an exemplary embodiment of the invention.

Next, operation of the planetary gear unit 13 is described. FIG. 3 is a diagram for explaining operation of the planetary gear unit consistent with an exemplary embodiment of the invention, FIG. 4 is a car-speed diagram in normal running of the hybrid vehicle consistent with an exemplary embodiment of the invention, and FIG. 5 is a torque diagram in the normal running of the hybrid vehicle consistent with an exemplary embodiment of the invention.

In the planetary gear unit 13 (FIG. 2), since the carrier CR is linked with the engine 11, sun gear S is linked with the generator 16, and the ring gear R is linked with the driving motor 25 and the driving wheel 37 via the output shaft 14 and a fixed gear array respectively, ring-gear-rotation-speed NR that is rotation speed of the ring gear R is equal to output-shaft-rotation-speed that is rotation speed outputted to the output shaft 14, rotation speed of the carrier CR is equal to the engine-rotation-speed NE, and rotation speed of the sun gear S is equal to the generator-rotation-speed NG. When the number of teeth of the ring gear R is $\rho$ times (two times in this embodiment) as the number of teeth of the sun gear S, the following relationship is established:

$$(\rho+1)\cdot NE = 1\cdot NG + \rho \cdot NR.$$

Therefore, the rotational speed NE of the engine can be calculated based on the ring-gear-rotation-speed NR and the generator-rotation-speed NG as follows:

$$NE = (1\cdot NG + \rho\cdot NR)/(\rho+1) \qquad (1).$$

According to the equation (1), a relationship equation of rotation speed of the planetary gear unit 13 is established.

Engine-torque TE, ring-gear-torque TR that is generated in the ring-gear-torque R, and generator-torque TG are in a relation of, $$TE/TR/TG = (\rho+1)/\rho/1 \qquad (2);$$

and receive reaction force from each together. According to the equation (2), a relationship equation of torque of the planetary gear unit 13 is established.

In normal running of the hybrid vehicle, any of the ring gear R, carrier CR and sun gear S are rotated in a forward direction, and as shown in FIG. 4, any of the ring-gear-rotation-speed NR, the engine-rotation-speed NE and the generator-rotation-speed NG exhibit positive values. Since the ring-gear-torque TR and the generator-torque TG are obtained by proportionally dividing the engine-torque TE in a torque ratio determined by the number of teeth of the planetary gear unit 13, a result of adding the ring-gear-torque TR and the generator-torque TG in the torque diagram shown in FIG. 5 is the engine-torque TE.

An air conditioner, not shown, as auxiliary equipment is linked with a crankshaft, not shown, of the engine 11 via a pulley, a belt, and an air-conditioner clutch, which are not shown. When a switch of the air conditioner is operated, a starter motor is driven and the engine 11 is started, and the air-conditioner clutch, not shown, is engaged, thereby the rotation of the output shaft 12 is transmitted to the air conditioner, and thus the air conditioner is operated.

Figure 6:
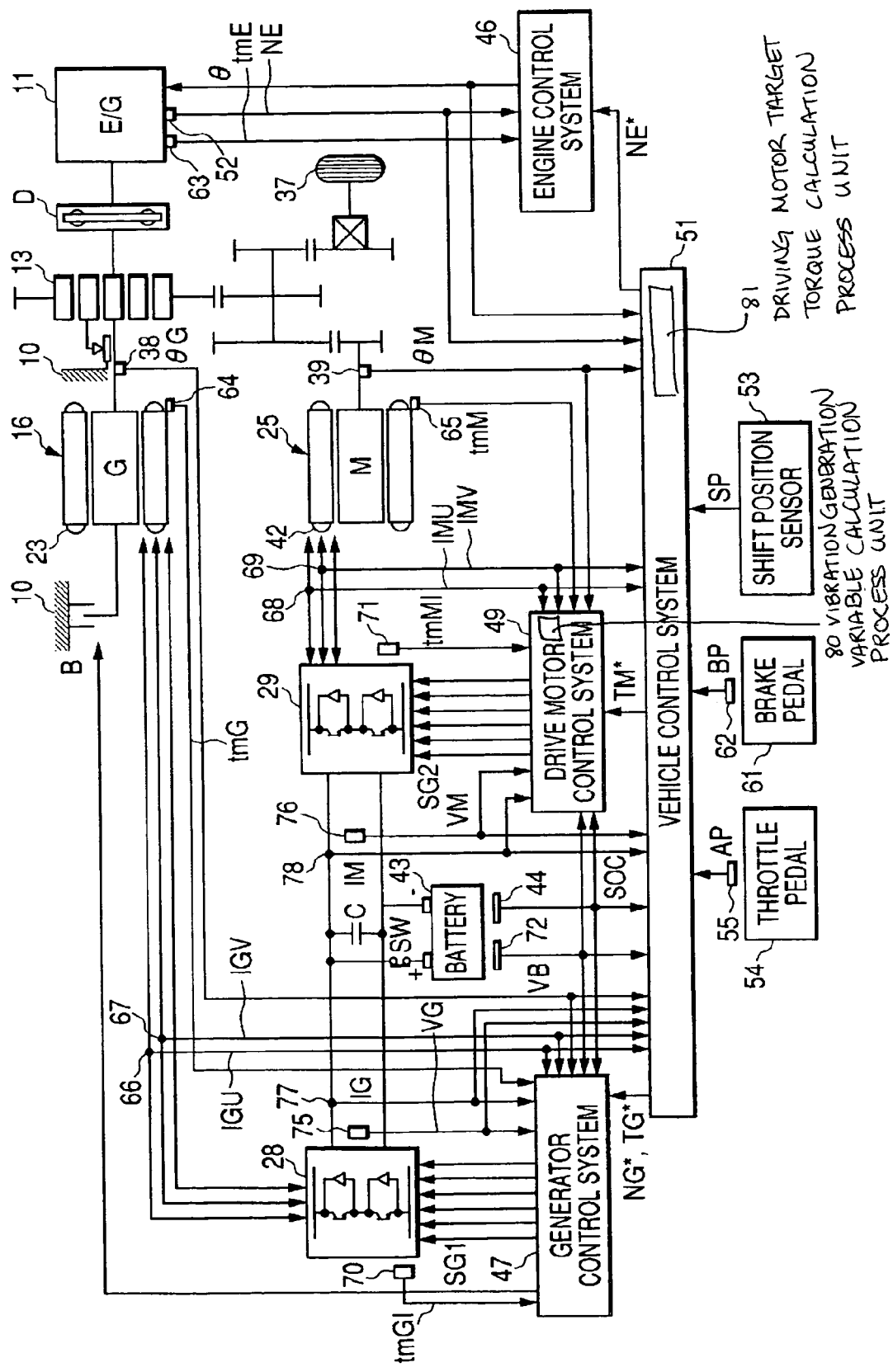
FIG. 6 is a conceptual diagram of a drive-control-system of the hybrid vehicle consistent with an exemplary embodiment of the invention.

Next, a drive-control-system of the hybrid vehicle as the drive-control-system of the electromotive vehicle that controls the vehicle-drive-system is described. FIG. 6 is a conceptual diagram of a drive-control-system of the hybrid vehicle consistent with an exemplary embodiment of the invention.

In FIG. 6, reference numeral 10 is the case, reference numeral 11 is the engine (E/G), reference numeral 13 is the planetary gear unit, reference numeral 16 is the generator (G), B is the generator brake, reference numeral 25 is the driving motor (M), reference numeral 28 is an inverter as a generator inverter for driving the generator 16, reference numeral 29 is an inverter as a driving-motor inverter for driving the driving motor 25, reference numeral 37 is the driving wheel, reference numerals 38 and 39 are the position sensors, and 43 is a battery. The inverters 28, 29 are connected to the battery 43 via a power switch SW, and the battery 43 supplies DC electric current to the inverters 28, 29 when the power switch SW is in an on-state. Each of the inverters 28, 29 has a plurality of, for example, six transistors, as switching elements, and each of the transistors is unified by pairs to form a transistor module in each phase.

At an entrance side of the inverter 28, a generator-inverter-voltage sensor 75 is a first DC-voltage detecting-element for detecting generator-inverter-voltage VG that is DC voltage applied to the inverter 28, and a generator-inverter-current sensor 77 is a first DC-current detecting-element for detecting generator-inverter-current IG that is DC current applied to the inverter 28 are arranged. At an entrance side of the inverter 29, a driving-motor-inverter-voltage sensor 76 as a second DC-voltage detecting-element for detecting driving-motor inverter voltage VM that is DC voltage applied to the inverter 29, and a driving-motor-inverter-current sensor 78 as a second DC-current detecting-element for detecting driving-motor-inverter-current IM that is DC current applied to the inverter 29 are arranged. The generator-inverter-voltage VG and the generator-inverter-current IG are sent to a vehicle-control-system 51 and a generator-control-system 47, and the driving-motor-inverter-voltage VM and the driving-motor-inverter-current IM are sent to the vehicle control system 51 and a driving-motor-control-system 49. A smoothing capacitor C is connected between the battery 43 and the inverters 28, 29.

The vehicle-control-system 51 comprises a CPU, not shown, and a recording device, not shown, and controls the vehicle-control-system as a whole, and functions as a computer according to a predetermined program or data. An engine-control-system 46, a generator-control-system 47 and a driving-motor-control-system 49 are connected to the vehicle-control-system 51. The engine-control-system 46, which comprises a CPU, not shown, and a recording device, not shown, sends an indicating signal of a degree of throttle opening 0 or valve timing to the engine 11 and the vehicle-control-system 51 in order to control the engine 11. The generator-control-system 47, which comprises a CPU, not shown, and a recording device, not shown, sends a driving signal SG1 to the inverter 28 in order to control the generator 16. The driving-motor-control-system 49, which comprises a CPU, not shown, and a recording device, not shown, sends a driving signal SG2 to the inverter 29 in order to control the diving-motor 25. The engine-control-system 46, generator-control-system 47, and driving-motor-control-system 49 form a first control system which is located at a lower level than the vehicle-control-system 51, and the vehicle-control-system 51 forms a second control system which is located at a higher level than the engine-control-system 46, generator-control-system 47, and driving-motor-control-system 49. The engine-control-system 46, generator-control-system 47, and driving-motor-control-system 49 also function as a computer according to a predetermined program or data.

The inverter 28, which is driven according to the driving signal SG1, receives DC electric current from the battery 43, generates current in each phase IGU, IGV, or IGW, and supplies the electric current in each phase IGU, IGV, or IGW to the generator 16 in power running, and receives the electric current in each phase IGU, IGV, or IGW from the generator 16, generates DC electric current, and supplies it to the battery 43 in regeneration.

The inverter 29, which is driven according to the driving signal SG2, receives DC electric current from the battery 43, generates electric current in each phase IMU, IMV, or IMW, and supplies the electric current in each phase IMU, IMV, or IMW to the driving motor 25 in power running, and receives the electric current in each phase IMU, IMV, or IMW from the driving motor 25, generates DC electric current, and supplies it to the battery 43 in regeneration.

A remaining-battery-level detecting element 44 detects a remaining-battery-level SOC as a battery condition that is a condition of the battery 43. An engine-rotation-speed sensor 52 detects the engine-rotation-speed NE. Shift position sensor 53 detects a shift position SP. Reference numeral 54 is an accelerator pedal. Accelerator switch 55 is an accelerator-operation-detecting-element that detects an accelerator-pedal-position AP that is a position of the accelerator pedal 54 (pushing level). Reference numeral 61 is a brake pedal. Brake switch 62 is a brake-operation-detecting-element that detects a brake-pedal-position BP that is a position of the brake pedal 61 (pushing level).

Engine temperature sensor 63 detects temperature tmE of the engine 11. Generator-temperature sensor 64 detects temperature of the generator 16, for example temperature tmG of a coil 23. Driving-motor-temperature sensor 65 detects temperature of the driving motor 25, for example temperature tmM of a coil 42. First inverter-temperature-sensor 70 detects temperature tmGI of the inverter 28. Second inverter-temperature-sensor 71 detects temperature tmMI of the inverter 29. The temperature tmE is sent to the engine-control-system 46, the temperatures tmG, tmGI are sent to the generator-control-system 47, and the temperatures tmM, tmMI are sent to the driving-motor-control-system 49.

Furthermore, current sensors 66 to 69 are AC-electric-current detecting-elements that detect the electric current in each phase IGU, IGV, IMU or IMV respectively. Battery voltage sensor 72 is a voltage-detecting-element for the battery 43, which detects the battery voltage VB as the battery condition. The battery voltage VB and the remaining-battery-level SOC are sent to the generator control system 47, driving-motor-control-system 49, and vehicle-control-system 51. Battery current or battery temperature can be also detected as the battery condition. The remaining-battery-level detecting-device 44, the battery-voltage-sensor 72, a battery-current-sensor, not shown, and a battery-temperature-sensor, not shown, form a battery-condition detecting-part. The electric current IGU, IGV is sent to the generator-control-system 47 and the vehicle-control-system 51, and the current IMU, IMV is sent to the driving-motor-control-system 49 and the vehicle-control-system 51.

The vehicle-control-system 51 sends an engine-control-signal to the engine-control-system 46, and the engine-control-system 46 performs setting of starting and stopping of the engine 11.

A generator-rotation-speed calculation-process unit, not shown, in the generator-control-system 47 performs a calculation process of generator-rotation-speed, wherein it reads the rotor position $\theta Q$, calculates a percentage of change $\delta\theta G$ by differentiating the rotor position $\theta G$, and assumes the percentage of change $\delta\theta G$ as angular velocity $\omega G$ of the generator 16 and as the generator-rotation-speed NG. A generator-angular-acceleration calculation-process unit, not shown, in the generator-control-system 47 performs the generator-angular-acceleration calculation-process, and calculates the angular acceleration (percentage of change of rotation) $\alpha G$ of the generator 16 by further differentiating the percentage of change $\delta\theta G$.

A driving-motor-rotation-speed calculation-process unit, not shown, in the driving-motor-control-system 49 performs a driving-motor-rotation-speed calculation-process, wherein the unit reads the rotor position $\theta M$, calculates a percentage of change $\delta\theta M$ by differentiating the rotor position $\theta M$, and assumes the percentage of change $\delta\theta M$ as angular velocity $\omega M$ of the driving motor 25 and as the driving-motor-rotation-speed NM. A driving-motor-angular-acceleration calculation-process unit in the driving-motor-control-system 49 performs a vibration-generation-variable calculation-process and a driving-motor-angular-acceleration calculation-process, and calculates the angular acceleration $\alpha M$ of the driving motor 25 by further differentiating the percentage of change $\delta\theta M$. The angular acceleration $\alpha M$ is a variable of vibration generation that appears with vibration generated in the vehicle-driving-system. Thus, the driving-motor-angular-acceleration calculation-process unit functions as a vibration-generation-variable calculation-process unit 80, and performs a driving-motor-angular-acceleration calculation-process.

Furthermore, a car-speed calculation-process unit, not shown, in the vehicle-control-system 51 performs a car-speed calculation-process, wherein it reads the percentage of change $\delta\theta M$, and calculates car speed V based on the percentage of change $\delta\theta M$ and a gear ratio $\gamma V$ in a torque-transmission-system from the output shaft 26 to the driving wheel 37.

The vehicle-control-system 51 sets engine-target-rotation-speed NE* indicating a target value of the engine-rotation-speed NE, generator-target-rotation-speed NG* indicating a target value of the generator-rotation-speed NC, generator-target-torque TG* indicating a target value of the generator torque TG, and driving-motor-target-torque TM* indicating the target value of the driving-motor-torque TM. The engine-target-rotation-speed NE*, generator-target-rotation-speed NG*, generator-target-torque TG*, and driving-motor-target-torque TM* form a controlled instruction value.

Since the rotor position $\theta G$ and the generator-rotation-speed NG are proportional to each other, and the rotor position $\theta M$, the driving-motor-rotation-speed NM, and car speed V are proportional to each together, a position sensor 38 and the generator-rotation-speed calculation-process unit can function as a detecting part of the generator-rotation-speed that detects the generator-rotation-speed NG, a position sensor 39 and the driving-motor-rotation-speed calculation-process unit can function as a detecting part of the rotation speed of the driving-motor that detects the driving-motor-rotation-speed NM, and the position sensor 39 and the car-speed calculation-process unit can function as the car-speed detecting part that detects the car speed V.

While the engine-rotation-speed NE is detected by the engine-rotation-speed sensor 52 in the embodiment, the engine-rotation-speed NE can be calculated in the engine-control-system 46. Moreover, while the car speed V is calculated by the car-speed calculation-process unit based on the rotor position $\theta M$, it is possible that the ring-gear-rotation-speed NR is detected, and the car speed V is calculated based on the ring-gear-rotation-speed NR, or the car speed V is calculated based on driving-wheel-rotation-speed that is rotation speed of the driving wheel 37. In this case, a ring-gear-rotation-speed sensor and a driving-wheel-rotation-speed sensor are arranged as car-speed detecting elements.

Next, operation of the drive-control-system of the hybrid vehicle configured as above is described.

Figure 7:
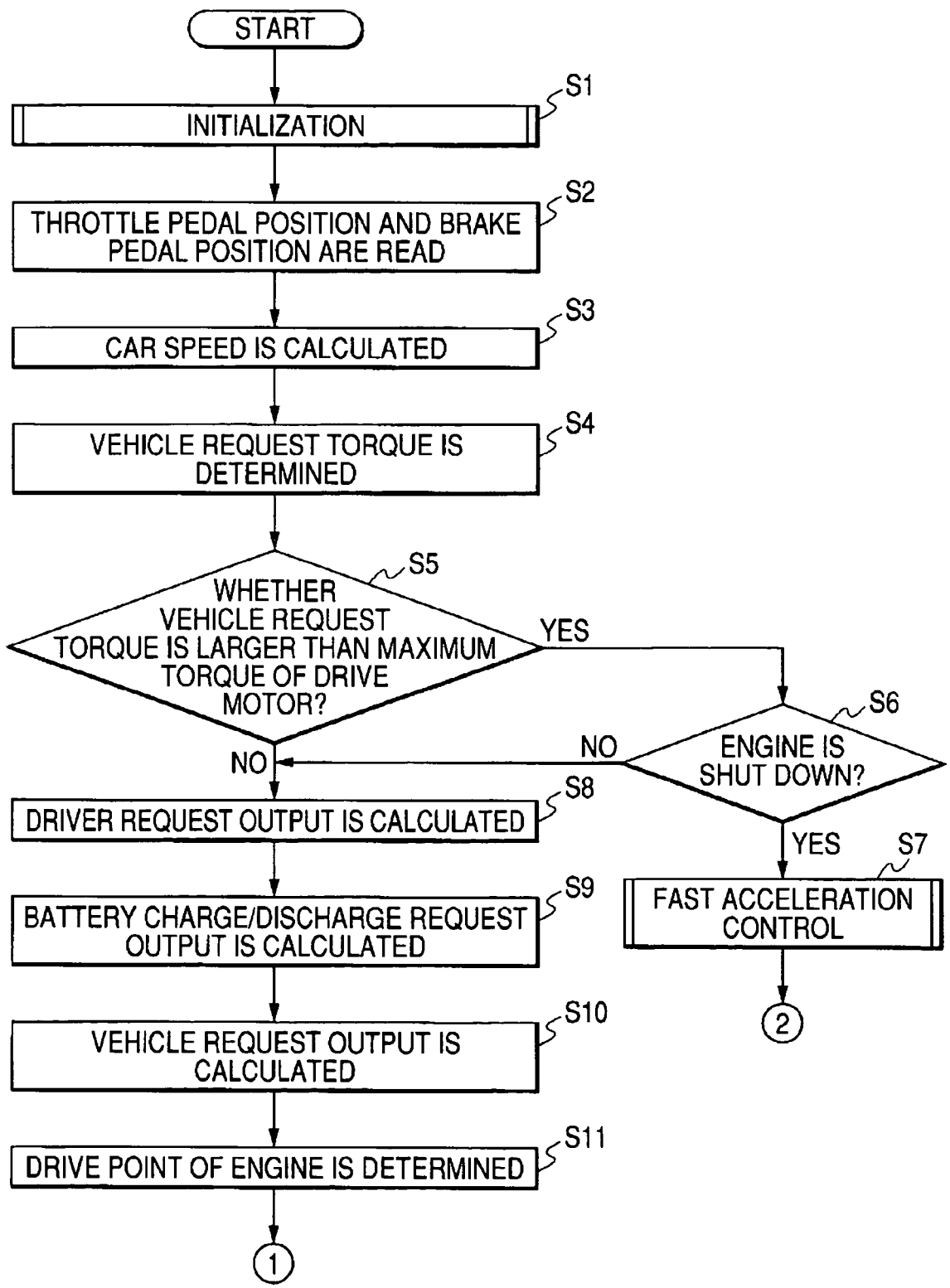
FIG. 7 is a first main flowchart showing operation of the drive-control-system of the hybrid vehicle consistent with an exemplary embodiment of the invention.
Figure 8:
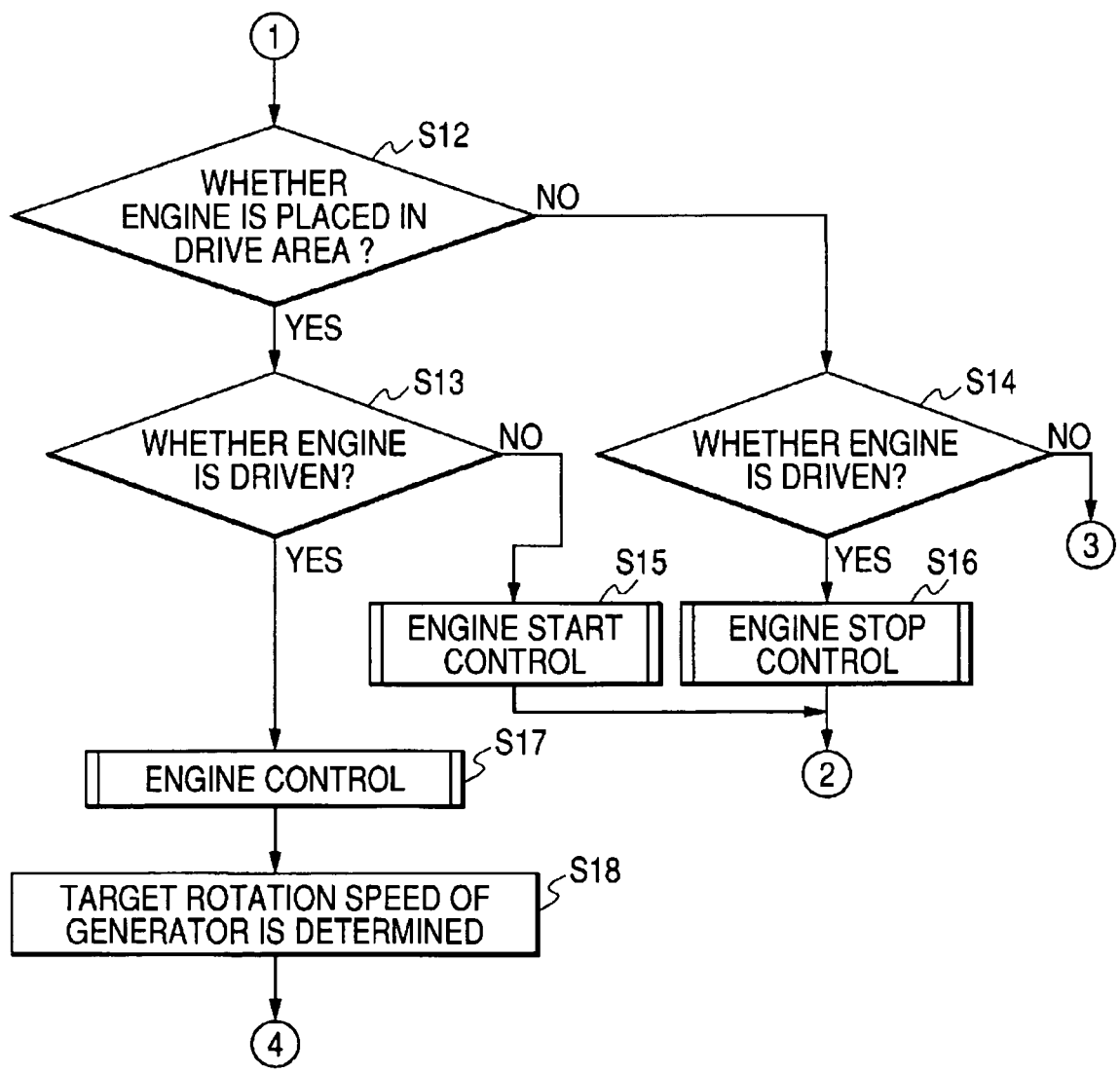
FIG. 8 is a second main flowchart showing the operation of the drive-control-system of the hybrid vehicle consistent with an exemplary embodiment of the invention.
Figure 9:
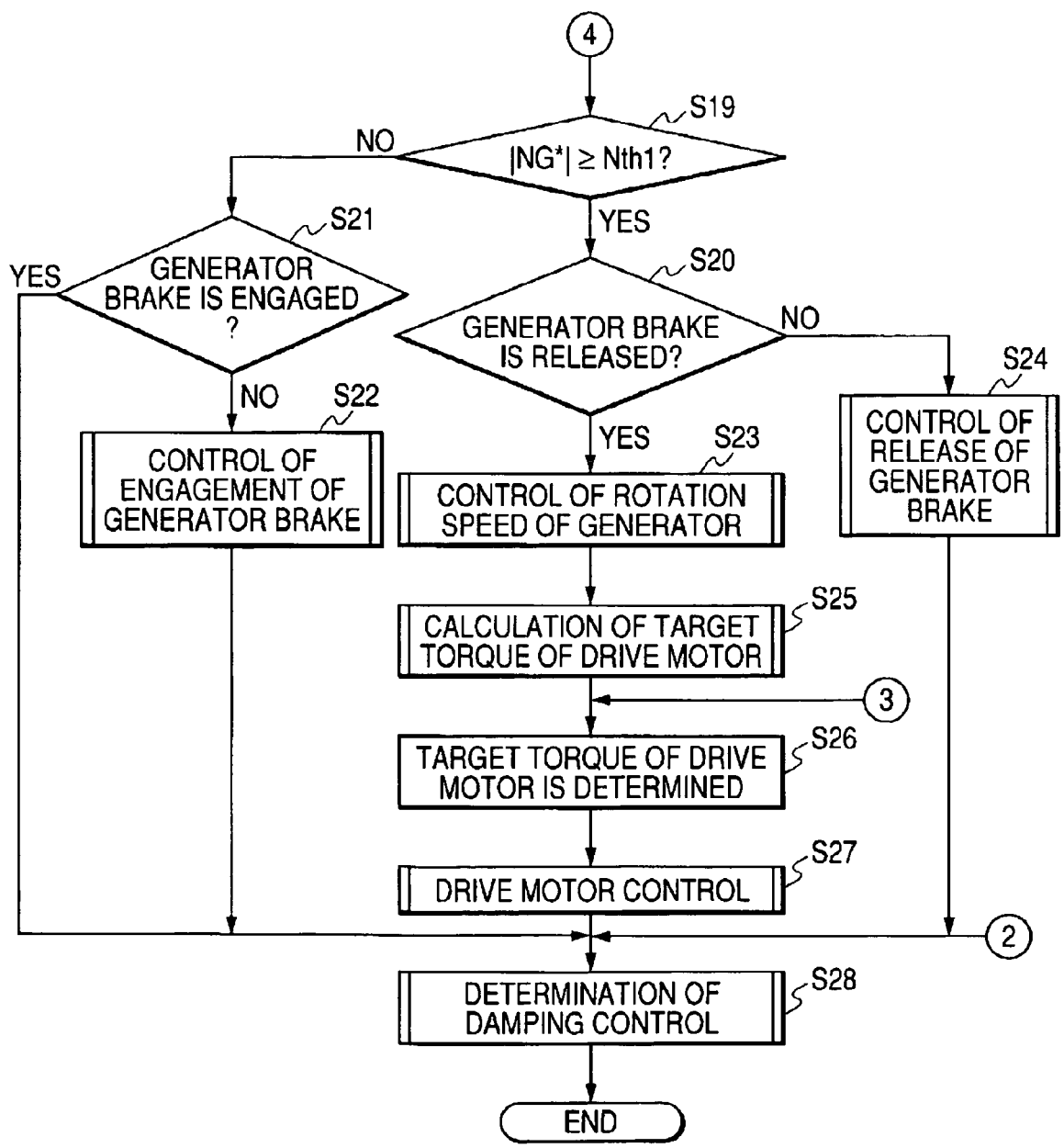
FIG. 9 is a third main flowchart showing the operation of the drive-control-system of the hybrid vehicle consistent with an exemplary embodiment of the invention.
Figure 10:
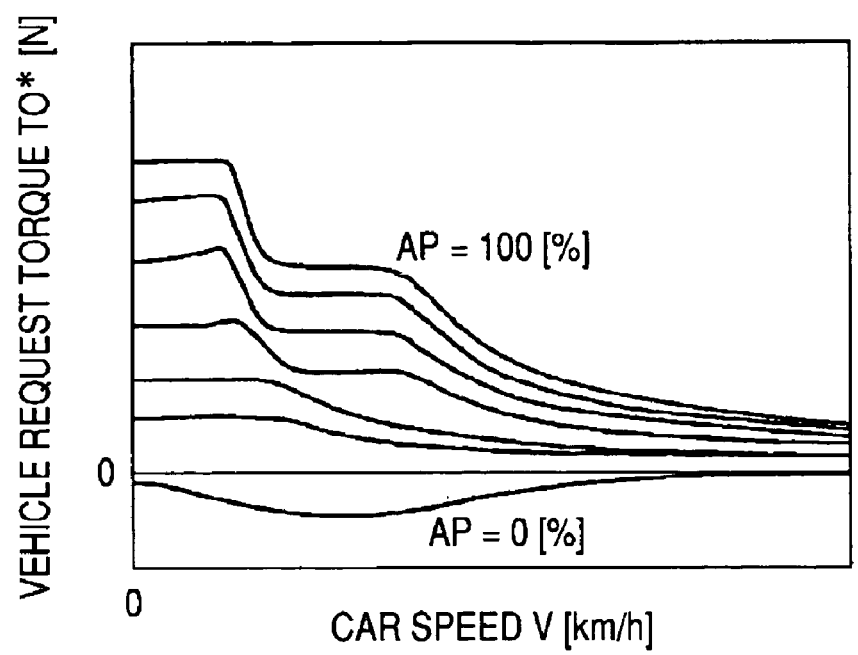
FIG. 10 is a diagram showing a first vehicle-request-torque map consistent with an exemplary embodiment of the invention.
Figure 11:
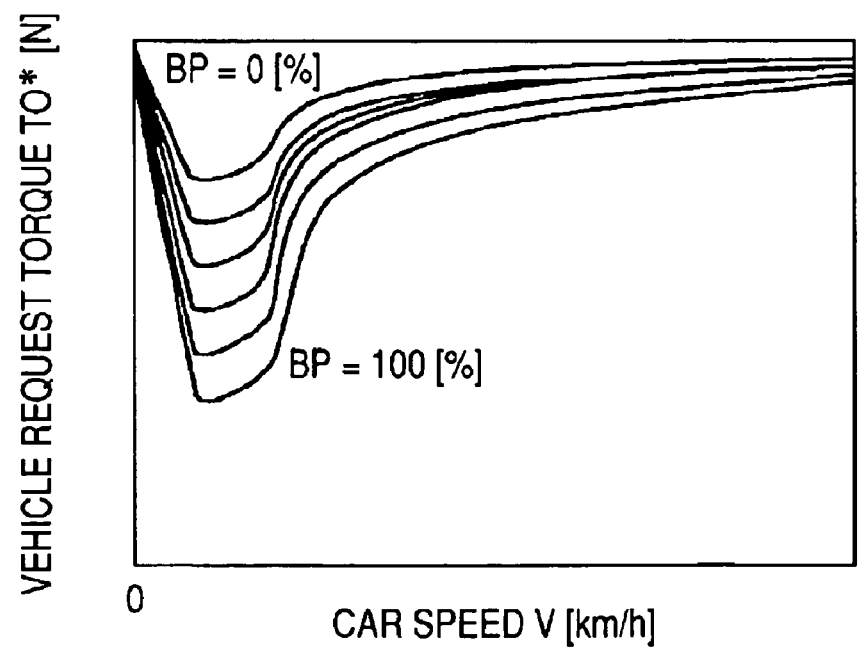
FIG. 11 is a diagram showing a second vehicle-request-torque map consistent with an exemplary embodiment of the invention.
Figure 12:
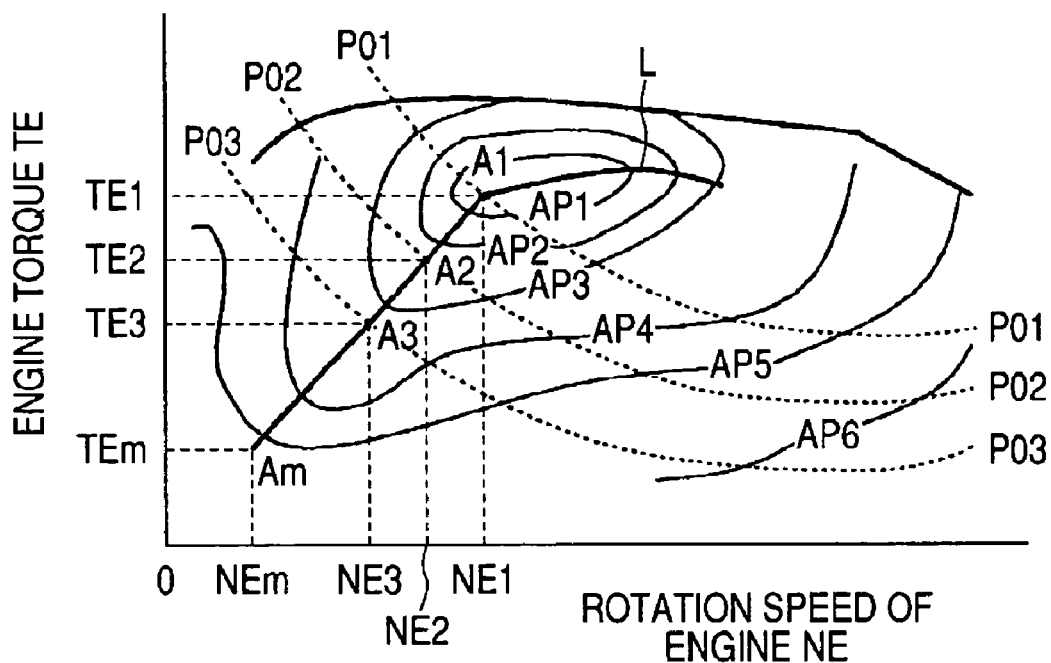
FIG. 12 is a diagram showing an engine-target-driving-condition map consistent with an exemplary embodiment of the invention.
Figure 13:
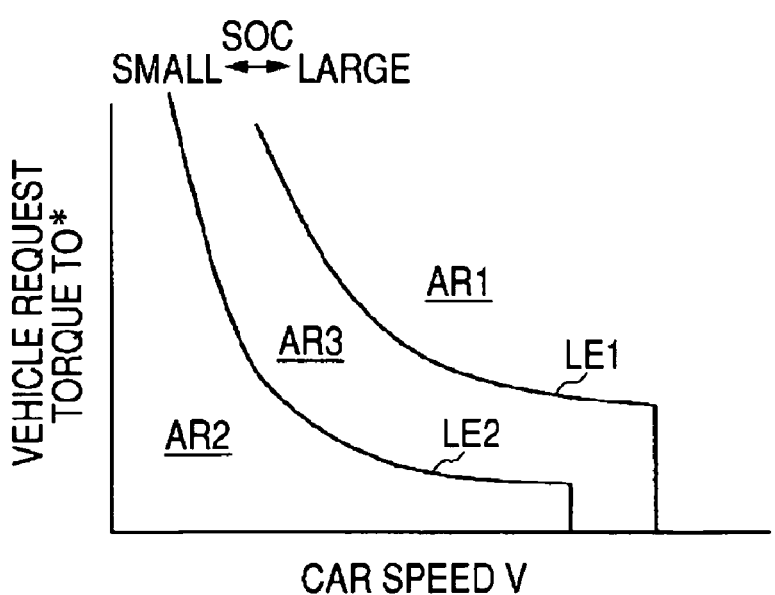
FIG. 13 is a diagram showing an engine-driving-area map consistent with an exemplary embodiment of the invention.

FIG. 7 is a first main flowchart showing operation of the drive-control-system of the hybrid vehicle consistent with the exemplary embodiment of the invention, FIG. 8 is a second main flowchart showing the operation of the drive-control-system of the hybrid vehicle consistent with the exemplary embodiment of the invention, FIG. 9 is a third main flowchart showing the operation of the drive-control-system of the hybrid vehicle consistent with the exemplary embodiment of the invention, FIG. 10 is a diagram showing a first vehicle-request-torque map consistent with the exemplary embodiment of the invention, FIG. 11 is a diagram showing a second vehicle-request-torque map consistent with an exemplary embodiment of the invention, FIG. 12 is a diagram showing an engine-target-driving-condition map consistent with the exemplary embodiment of the invention, and FIG. 13 is a diagram showing an engine-driving-area map consistent with the exemplary embodiment of the invention. The car speed V is plotted as abscissa and the vehicle-request-torque TO* as ordinate in FIGS. 10, 11 and 13, and the engine-rotation-speed NE is plotted as abscissa and the engine-torque TE as ordinate in FIG. 12.

First, an initialization unit, not shown, in the vehicle-control-system 51 (FIG. 6) performs initialization and thus makes various variables to be initial values. Next, the vehicle-control-system 51 reads the acceleration-pedal-position AP from the acceleration switch 55 and the brake-pedal-position BP from the brake switch 62. The car-speed calculation-process unit reads the rotor position θM, calculates the percentage of change δθM of the rotor position θM, and calculates the car speed V based on the percentage of change δθM and the gear ratio γV.

Subsequently, a vehicle-request-torque determination-process unit, not shown, in the vehicle-control-system 51 performs vehicle-request-torque determination-process, and when the acceleration pedal 54 is pushed, the unit refers to the first vehicle-request-torque map in FIG. 10 which is recorded in the recording device of the vehicle-control-system 51, and when the brake pedal 61 is pushed, the unit refers to the second vehicle-request-torque map in FIG. 11 which is recorded in the recording device, thereby determines the vehicle-request-torque TO* required for running the hybrid vehicle, which has been previously set in correspondence with the acceleration-pedal-position AP, the brake-pedal-position BP, and car speed V.

Next, the vehicle-control-system 51 determines whether the vehicle-request-torque TO* is larger than the maximum driving-motor-torque TMmax indicating the maximum value of the driving-motor-torque TM. When the vehicle-request-torque TO* is larger than the maximum driving-motor-torque TMmax, the vehicle-control-system 51 determines whether the engine 11 has been stopped, and when the engine 11 has been stopped, a sudden-acceleration control-process unit, not shown, in the vehicle-control-system 51 performs sudden-acceleration control-process, and drives the driving motor 25 and the generator 16 and thus runs the hybrid vehicle.

When the vehicle-request-torque TO* is equal to the maximum driving-motor-torque TMmax or smaller, and when the vehicle-request-torque TO* is larger than the maximum driving-motor-torque TMmax, and when the engine 11 has not been stopped, a driver-request-output calculation-process unit, not shown, in the vehicle-control-system 51 performs a driver-request-output calculation-process, and calculates driver-request-output PD by multiplying the vehicle request torque TO* by the car speed V:

$$PD=TO^* \cdot V.$$

Next, a battery-charge/discharge-request-output calculation-process unit, not shown, in the vehicle-control-system 51 performs a battery-charge/discharge-request-output calculation-process, and reads the remaining-battery-level SOC from the remaining-battery-level detecting device 44, and calculates battery-charge/discharge-request-output PB based on the remaining-battery-level SOC.

Subsequently, a vehicle-request-output calculation-process unit, not shown, in the vehicle-control-system 51 performs a vehicle-request-output calculation-process, and calculates vehicle-request-output PO by adding the driver-request-output PD with battery-charge/discharge-request-output PB:

$$PO=PD+PB.$$

Next, a engine-target-drive-condition setting-process unit, not shown, in the vehicle-control-system 51 performs an engine-target-drive-condition setting-process, refers to the engine-target-drive-condition map in FIG. 12 which is recorded in the recording device of the vehicle-control-system 51, determines points A1 to Am, where lines PO1, PO2 . . . indicating the vehicle-request-output PO intersect with an optimum fuel-consumption curve L indicating the highest efficiency of the engine 11 at respective acceleration-pedal-positions AP1 to AP6, as drive points of the engine 11 in the engine-target-drive condition, determines engine torque TE1 to TE3 . . . TEm at the drive points as engine-target-torque TE* indicating target values of the engine torque TE, determines engine-rotation-speed NE1 to NE3 . . . NEm at the drive points as engine-target-rotation-speed NE*, and sends the engine-target-rotation-speed NE* to the engine-control-system 46.

Figure 14:
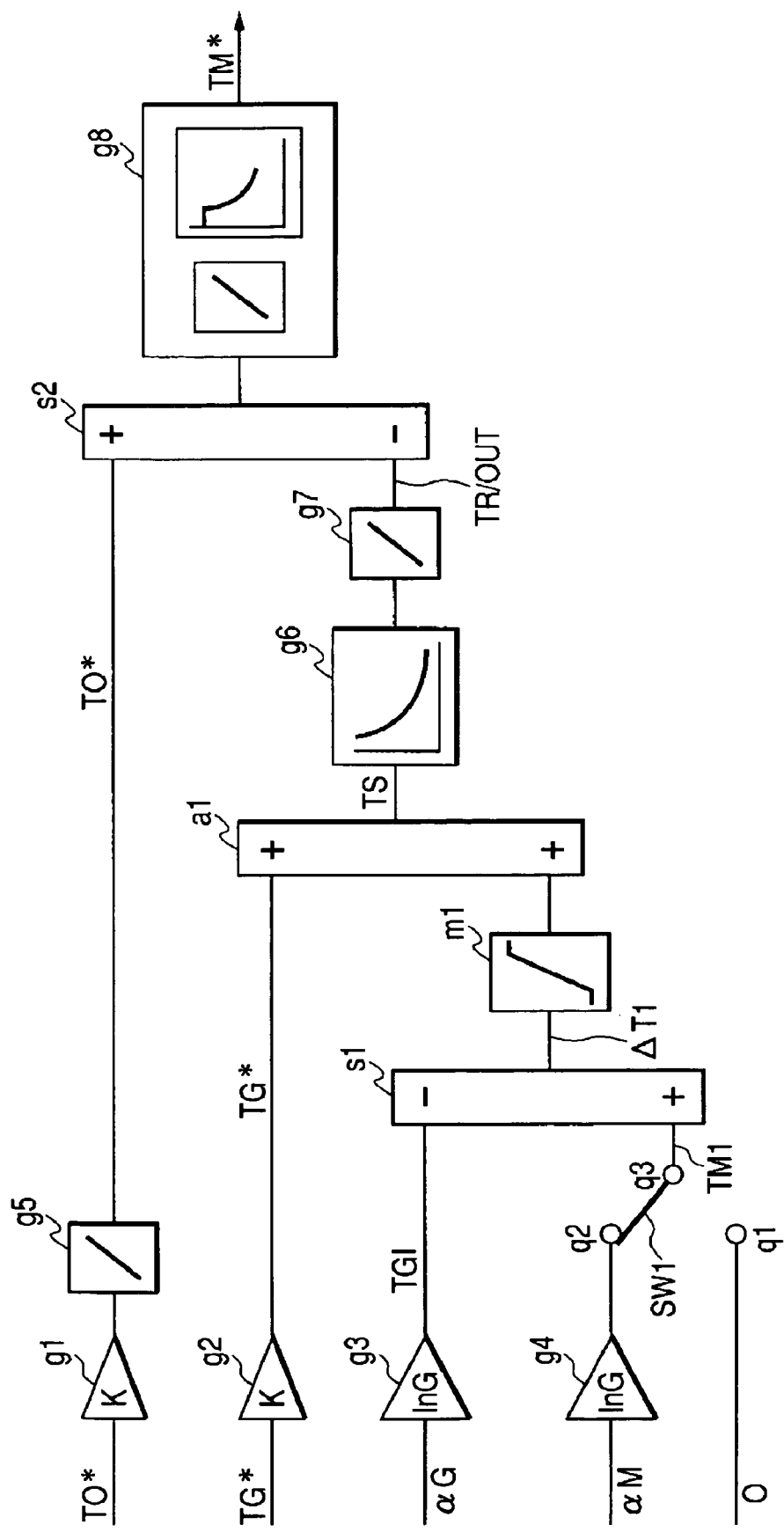
FIG. 14 is a block diagram showing operation of the vehicle-control-system consistent with an exemplary embodiment of the invention.

Then, the engine-control-system 46 determines whether the engine 11 is in a drive area AR1 with reference to the engine-drive-area map in FIG. 14 which is recorded in the recording device in the engine-control-system 46. In FIG. 13, AR1 is a drive area where the engine 11 is driven, AR2 is a stopping area where the drive of the engine 11 is stopped, and AR3 is a hysteresis area. LE1 is a line at which the stopped engine 11 is driven, and LE2 is a line at which the driven engine 11 is stopped. The line LE1 is moved right in FIG. 13 with increase in the remaining-battery-level SOC, making the drive area AR1 smaller; and moved left in FIG. 13 with decrease in the remaining-battery-level SOC, making the drive area AR1 larger.

Although the engine 11 is placed in the drive area AR1, when the engine 11 is not driven, an engine-starting-control-process unit, not shown, in the engine-control-system 46 performs an engine-starting-control-process, and thus starts the engine 11. Although the engine 11 is not placed in the drive area AR1, when the engine 11 is driven, the engine-stopping control-process unit, not shown, in the engine-control-system 46 performs an engine-stopping control-process, and thus stops the drive of the engine 11. When the engine 11 is not placed in the drive area AR1, and when the engine 11 is not driven, the vehicle-control-system 51 determines the vehicle-request-torque TO* as the driving-motor-target-torque TM*, and sends the driving-motor-target-torque TM* to the driving-motor-control-system 49. A driving-motor control-process unit, not shown, in the driving-motor-control-system 49 performs the driving-motor control-process, and performs torque control of the driving motor 25.

When the engine 11 is placed in the drive area AR1, and when the engine 11 is driven, the engine control-process unit, not shown, in the engine-control-system 46 performs an engine control process, and controls the engine 11 in a predetermined manner.

Next, a generator-target-rotation-speed calculation-process unit, not shown, in the vehicle-control-system 51 performs a generator-target-rotation-speed calculation-process, specifically, the generator-target-rotation-speed calculation-process unit reads the rotor position θM from the position sensor 39, and calculates the ring-gear-rotation-speed NR based on the rotor position θM and the gear ratio γR from the output shaft 26 to the ring gear R, and reads the engine-target-rotation-speed NE* determined in the engine-target-drive-condition setting-process, and calculates and determines the generator-target-rotation-speed NG* according to the relationship equation of rotation speed based on the ring-gear-rotation-speed NR and the engine-target-rotation-speed NE*.

When the hybrid vehicle configured as above is run by the driving motor 25 and the engine 11, in the case that the generator-rotation-speed NG is low, power consumption becomes large, thereby generation efficiency of the generator 16 decreases, and accordingly, fuel consumption of the hybrid vehicle becomes bad. Thus, when an absolute value |NG*| of the generator-target-rotation-speed NG* is smaller than a predetermined rotation speed, the generator brake B is engaged, thereby the generator 16 is mechanically stopped, so that the fuel consumption is improved.

Thus, the generator-control-system 47 determines whether the absolute value |NG*| is equal to a predetermined rotation speed Nthl (for example, 500 rpm) or larger. When the absolute value |NG*| is equal to the rotation speed Nthl or larger, the generator-control-system 47 determines whether the generator brake B is released. When the generator brake B is released, a generator-rotation-speed control-process unit, not shown, in the generator-control-system 47 performs a generator-rotation-speed control-process, and drives the generator 16 and performs the torque control of the generator 16. When the generator brake B is not released, a not-shown generator-brake-release control-process unit in the generator-control-system 47 performs a generator-brake-release control-process, and releases the generator brake B.

When the absolute value |NG*| is lower than the rotation speed Nthl, the generator-control-system 47 determines whether the generator brake B is engaged. When the generator brake B is not engaged, a generator-brake-engagement control-process unit, not shown, in the generator-control-system 47 performs a generator-brake-engagement control-process, thereby engages the generator brake B.

In the generator-rotation-speed control-process, when the generator-target-torque TG* is determined, the torque control of the generator 16 is performed based on the generator-target-torque TG*, and the predetermined generator torque TG is generated, since the engine torque TE, ring-gear-torque TR and generator-torque TG receive the reaction force from each together as described before, the generator torque TG is converted into the ring-gear-torque TR and outputted from the ring gear R.

When the generator-rotation-speed NG varies as the ring-gear-torque TR is outputted from the ring gear R, and the ring-gear-torque TR varies, the varied ring-gear-torque TR is transmitted to the driving wheel 37, resulting in deterioration in running feeling of the hybrid vehicle. Thus, torque corresponding to inertia of the generator 16 (inertia of the rotor 21 and rotor shaft) involved by the variation of the generator-rotation-speed NG is allowed, and then the ring-gear-torque TR when the torque control of the generator 16 is performed based on the generator-target-torque TG* is calculated, and then driving-shaft-torque TR/OUT that is torque in the driving shaft 50 when the ring-gear-torque TR is outputted is estimated, and then the driving-motor-target-torque TM* is calculated based on the estimated driving-shaft-torque TR/OUT, and then the driving motor 25 is driven.

Thus, a driving-motor-target-torque calculation-process unit 81 in the vehicle-control-system 51 performs a driving-motor-target-torque calculation-process, and calculates driving-motor-target-torque TM*. Therefore, the driving-motor-target-torque calculation-process unit reads the generator-target-torque TG*, and calculates the ring-gear-torque TR when the torque control of the generator 16 is performed based on the generator-target-torque TG* and a ratio of the number of teeth of the ring gear R to the number of teeth of the sun gear S.

Thus, when the inertia of the generator 16 is assumed to be InG, the sun-gear-torque TS that is torque applied to the sun gear S is obtained by subtracting an equivalent-torque-component (inertia torque) TGI corresponding to the inertia InG:

$$TGI = InG \cdot \alpha G$$

from the generator-target-torque TG*:

$$TS = TG* - TGI = TG - InG \cdot \alpha G$$

When the engine-rotation-speed NE is constant, the equivalent-torque-component TGI typically exhibits a negative value to an acceleration direction while the hybrid vehicle is accelerated, and exhibits a positive value to an acceleration direction while the hybrid vehicle is decelerated.

Assuming that the number of teeth of the ring gear R is ρ times as the number of teeth of the sun gear S, since the ring-gear-torque TR is ρ times as the sun-gear-torque TS, the following is given:

$$\begin{aligned} TR &= \rho \cdot TS \\ &= \rho \cdot (TG* - TGI) \\ &= \rho \cdot (TG* - ING \cdot \alpha G). \end{aligned} \qquad (4)$$

In this way, the ring-gear-torque TR can be calculated based on the generator-target-torque TG* and the equivalent-torque-component TGI.

Next, the driving-motor-target-torque calculation-process unit estimates the driving-shaft-torque TR/OUT based on the generator-target-torque TG* and the equivalent-torque-component TGI. That is, the driving-motor-target-torque calculation-process unit estimates and calculates the driving-shaft-torque TR/OUT based on a ratio of the number of teeth of the second counter drive gear 27 to the number of teeth of the ring gear R.

When the generator brake B is engaged, the generator-target-torque TG is made to be zero (0), and the ring-gear-torque TR becomes proportional to the engine torque TE. Thus, when the generator brake B is engaged, the driving-motor-target-torque calculation-process unit reads the engine torque TE, and calculates the ring-gear-torque TR based on the engine torque TE according to the relationship equation of torque and estimates the driving-shaft-torque TR/OUT based on the ratio of the number of teeth of the second counter drive gear 27 to the number of teeth of the ring gear R.

Subsequently, the driving-motor-target-torque calculation-process unit calculates a torque level corresponding to the torque, which is short only by the driving-shaft-torque TR/OUT as driving-motor-target-torque TM* by subtracting the driving-shaft-torque TR/OUT from the vehicle-request-torque TO*. Then, the vehicle-control-system 51 determines the calculated driving-motor-target-torque TM*, and sends the driving-motor-target-torque TM* to the driving-motor-control-system 49.

Subsequently, the driving-motor control-process unit in the driving-motor-control-system 49 performs the driving-motor control-process, and performs the torque control of the driving motor 25 based on the determined driving-motor-target torque TM*, and controls the driving-motor-target torque TM.

For example, when the engine 11 is started by engine-starting control-process in Step S15 described later, the engine 11 is stopped by engine-stopping control-process in Step S16, the generator brake B is engaged by generator-brake-engagement control-process in Step S22, or the generator brake B is released by generator-brake-release control-process in Step S24, the generator torque TG is varied, therefore predetermined driving-motor-torque TM is generated by the driving motor 25 in correspondence with the generator torque TG. However, following this, variation occurs in the input torque or output torque of the vehicle-drive-system, and variation occurs in the driving-motor-torque TM generated in the driving wheel 37.

When the engine 11 is started or stopped, or the generator brake B is engaged/disengaged, in addition, the air conditioner is turned on/off, or a condition of the hybrid vehicle is suddenly changed, thereby the engine-rotation-speed NE is suddenly changed, or the hybrid vehicle is suddenly accelerated or decelerated, variation occurs in the output torque of the vehicle-drive-system, and variation occurs in the driving-motor-torque TM generated in the driving wheel 37.

In this case, torsion occurs in each shaft such as output shafts 12, 14, transmission shaft 17, counter shaft 30, or driving shaft 50, and the torsion causes vibration in the vehicle-drive-system, resulting in discomfort to the driver.

Thus, a damping-control determination-process unit, not shown, in the vehicle-control-system 51 performs a damping-control determination-process, wherein it performs a damping control process such that the angular acceleration αM is reduced, based on a predetermined instruction as a factor of the variation of the input torque or output torque of the vehicle-drive-system, that is, in the exemplary embodiment, an instruction for starting or stopping the engine 11, instruction for engaging/disengaging the generator brake B, or instruction for turning on/off the air conditioner, or based on sudden change of the engine-rotation-speed NE indicating the variation of the input torque or output torque, or sudden change of the acceleration-pedal-position AP and the brake-pedal-position BP.

Next, flowcharts of FIGS. 7 to 9 are described.

In Step S1, an initialization is performed. In Step S2, the acceleration-pedal-position AP and the brake-pedal-position BP are read. In Step S3, the car speed V is calculated. In Step S4, the vehicle-request-torque TO* is determined. In Step S5, it is determined whether the vehicle-request-torque TO* is larger than the maximum driving-motor-torque TMmax. When the vehicle-request-torque TO* is larger than the maximum driving-motor-torque TMmax, the process is advanced to Step S6, and when the vehicle-request-torque TO* is equal to the maximum driving-motor-torque TMmax or smaller, the process is advanced to Step S8.

In Step S6, it is determined whether the engine 11 has been stopped. When the engine 11 has been stopped, the process is advanced to Step S7, and when the engine 11 has not been stopped, the process is advanced to the Step S8.

In Step S7, the sudden-acceleration control-process is performed. In Step S8, the driver-request-output PD is calculated. In Step S9, the battery-charge/discharge-request-output PB is calculated. In Step S10, the vehicle-request-output PO is calculated. In Step S11, the drive point of the engine 11 is determined. In Step S12, it is determined whether the engine 11 is placed in the drive area AR1. When the engine 11 is placed in the drive area AR1, the process is advanced to Step S13, and when it is not placed in the drive area AR1, the process is advanced to Step S14. In Step S13, it is determined whether the engine 11 is driven. When the engine 11 is driven, the process is advanced to Step S17, and when it is not driven (has been stopped), the process is advanced to Step S15.

In Step S14, it is determined whether the engine 11 is driven. When the engine 11 is driven, the process is advanced to Step S16, and when the engine is not driven, the process is advanced to Step S26.

In Step S15, the engine-starting control-process is performed. In Step S16, the engine-stopping control-process is performed. In Step S17, the engine control process is performed. In Step S18, the generator-target-rotation-speed NG* is determined.

In Step S19, it is determined whether the absolute value |NG*| is equal to the rotation speed Nthl or more. When the absolute value |NG*| is equal to the rotation speed Nthl or larger, the process is advanced to Step S20, and when the absolute value |NG*| is smaller than the rotation speed Nthl, the process is advanced to Step S21.

In Step S20, it is determined whether the generator brake B is released. When the generator brake B is released, the process is advanced to Step S23, and when the generator brake is not released, the process is advanced to Step S24.

In Step S21, it is determined whether the generator brake B is engaged. When the generator brake B is engaged, the process is advanced to Step S28, and when the generator brake is not engaged, the process is advanced to Step S22.

In Step S22, the generator-brake-engagement control-process is performed. In Step S23, the generator-rotation-speed control-process is performed. In Step S24, the generator-brake-release control-process is performed. In Step S25, the driving-motor-target-torque calculation-process is performed. In Step S26, the driving-motor-target-torque TM* is determined. In Step S27, the driving-motor control-process is performed. In Step S28, the damping-control determination-process is performed, and then the process is finished.

Next, operation of the damping-control determination-process in Step S28 of FIG. 9 is described.

FIG. 14 is a block diagram showing operation of the vehicle-control-system in the embodiment of the invention, and FIG. 15 is a diagram showing subroutine of the damping-control determination-process in the embodiment of the invention.

In FIG. 14, g1 to g8 are multipliers, s1 and s2 are subtracters, SW1 is a switch, m1 is a limiter, and a1 is an adder. In the switch SW1, when the damping control process is not performed, connection is made between terminals q1 and q3, and when the damping control process is performed, connection is made between terminals q2 and q3.

As described before, in the vehicle-request-torque determination-process, when the vehicle-request-torque TO* is determined, the driving-motor-target-torque calculation-process unit sends the vehicle-request-torque TO* to the multipliers g1 and g5, and the multipliers g1 and g5 multiply it by gain k and predetermined gain respectively, and then send the multiplied vehicle-request-torque TO* to the subtracter s2.

When the generator-target-torque TG* is determined in the generator-rotation-speed control-process, the driving-motor-target-torque calculation-process unit sends the generator-target-torque TG* to the multiplier g2, assumes the ratio of the number of teeth of the ring gear R to the number of teeth of the sun gear S to be gain K in the multiplier g2, and multiplies the generator-target-torque TG* by the gain K, and then sends the multiplied generator-target-torque TG* to the adder a1.

Then, the driving-motor-target-torque calculation-process unit sends the angular acceleration αG of the generator 16 to the multiplier g3, and multiplies the angular acceleration αG by the inertia InG of the generator 16 in the multiplier g 3, thereby calculates the equivalent-torque-component TGI and sends it to the subtracter s1.

When the damping control process is performed and the driving-motor-torque TM is controlled such that the vibration in the vehicle-drive-system is damped at any time, especially in steady running, high-frequency vibration is generated in the sensor output from the position sensor 38 due to noise, resulting in discomfort to the driver.

Thus, the condition-determination-process unit 91 (FIG. 1) in the damping-control determination-process unit performs the condition determination process, and reads the instruction for starting or stopping the engine 11, the instruction for engaging/disengaging the generator brake B, the instruction for turning on/off the air conditioner, the percentage of change of rotation speed of the predetermined drive source, that is, the percentage of change ΔNE of the rotation speed NE of the engine 11, the percentage of change ΔAP of the acceleration-pedal-position AP, and the percentage of change ΔBP of the brake pedal position BP in the embodiment, as vibration indicia as the factors causing vibration in the vehicle-drive-system, and determines whether the damping-control-starting-condition is established based on the vibration indicia. The percentage of change of the generator rotation speed NG or the driving-motor-rotation-speed NM of the generator 16 or the driving motor 25 as the rotation speed of the predetermined drive source can be set as the vibration index. The acceleration-pedal-position AP and the brake-pedal-position BP form the operation level of the driver for accelerating/decelerating the vehicle.

When any of the instruction for starting or stopping the engine 11, the instruction for engaging/disengaging the generator brake B, and the instruction for turning on/off the air conditioner are not issued, and any of the percentages of change ΔNE, ΔAP, and ΔBP are equal to a threshold value ΔNEth, ΔAPth, and ΔBPth or lower, which are established respectively, the condition-determination-process unit 91 determines that the damping-control-starting-condition is not established.

When the damping-control-starting condition is not established, the driving-motor-target-torque calculation-process unit prohibits the damping control process, sends only the equivalent-torque-component TGI to the subtracter s1, and makes it to have a negative value in the subtracter s1, limits the upper limit and lower limit of it by the limiter m1, and then sends it to the adder a1. In this case, connection is made between the terminals q1 and q3 in the switch SW1. The driving-motor-target-torque calculation-process unit calculates the sun-gear-torque TS in the adder a1 based on the generator-target-torque TG* and the equivalent-torque-component TGI:

$TS=TG*-TGI;$ and sends the sun-gear-torque TS to the multipliers g6 and g7, multiplies the sun gear torque TS by a predetermined gain ρ in the multipliers g6 and g7, and calculates the ring-gear-torque TR:

$TR=\rho \cdot TS;$ and estimates the driving-shaft-torque TR/OUT, and sends the driving-shaft-torque TR/OUT to the subtracter s2.

Subsequently, the driving-motor-target-torque calculation-process unit calculates the driving-motor-target-torque TM* in the subtracter s 2 by subtracting the driving-shaft-torque TR/OUT from the vehicle-request-torque TO*, sends the driving-motor-target-torque TM* to the multiplier g8, multiplies the driving-motor-target-torque TM* by a predetermined gain, and outputs the multiplied driving-motor-target-torque TM*.

On the other hand, when at least one of the instruction for starting or stopping the engine 11, the instruction for engaging/disengaging the generator brake B, and the instruction for turning on/off the air conditioner is issued, or at least one of the percentages of change ΔNE, ΔAP, and ΔBP is larger than the threshold value ΔNEth, ΔAPth, and ΔBPth, the condition-determination-process unit 91 determines that the damping-control-starting-condition is established. Then, the damping-control-process unit 92 in the damping-control determination-process unit performs the condition-determination-process, and connects between the terminals q2 and q3 in the switch SW1.

The damping-control-process unit 82 reads the angular acceleration αM, sends it to the multiplier g4, and multiplies the angular acceleration αM by the inertia InM of the driving-motor 25 in the multiplier g4 and thus calculates the equivalent-torque-component TMI corresponding to the inertia InM, and then sends it to the subtracter s1.

Therefore, the driving-motor-target-torque calculation-process unit sends the equivalent-torque-component TGI to the subtracter s1, and subtracts the equivalent-torque-component TGI from the equivalent-torque-component TMI in the subtracter s1, and sends the subtracted equivalent-torque-component ΔTI, $\Delta TI=TMI-TGI,$ to the adder a1 after eliminating noise by limiting the upper limit and lower limit by the limiter m1.

In this way, the damping-control-process is performed when the damping-control-starting-condition is established, and the driving-motor-target-torque TM* is calculated in the damping-control-process. In this occasion, the equivalent-torque-component TGI is subtracted from the generator-target-torque TG* and the equivalent-torque-component TMI of the driving motor 25 is added to the result, thereby the driving-shaft-torque TR/OUT is calculated, in addition, the driving-shaft-torque TR/OUT is subtracted from the vehicle-request-torque TO*, therefore feedback control is performed such that the angular acceleration αM becomes zero.

Therefore, since the vibration generated in the vehicle-drive-system can be quickly damped, the discomfort to the driver can be prevented.

When the damping-control-starting condition is not established as in the steady running, since the damping-control-process is prohibited, even if the high-frequency vibration is generated in the sensor output from the position sensor 38, the discomfort is not brought to the driver.

Therefore, since it is not necessary that the control gain in the damping control is reduced, the sensor output from the position sensor 38 is passed through the filter to eliminate the noise, or the sensor output is subjected to the blunting in order to suppress the high-frequency vibration, response of damping control can be improved.

Although the feedback control is performed such that the angular acceleration αM is zero in the damping control process in the embodiment, it is possible that a rotation speed sensor as a detecting element for detecting the rotation speed of each shaft is arranged at least two points of each shaft such as output shafts 12, 14, transmission shaft 17, counter shaft 30, and drive shaft 50, and the feedback control is performed such that difference among the rotation speed detected by each rotation speed sensor is small, zero. In this case, the difference among the rotation speed is the variable of vibration generation.

Although the damping-control-process is performed when the damping-control-starting-condition is established, and the damping-control-process is prohibited when the damping-control-starting-condition is not established in the embodiment, even if the damping-control-starting condition is not established, the damping control process is performed, and the control gain in the damping control is reduced, the sensor output from the position sensor 38 is passed through the filter to eliminate the noise, or the sensor output is subjected to the blunting, thereby the discomfort to the driver can be prevented.

Next, the flowchart of FIG. 15 is described. In Step S28-1, the vibration index is read. In Step S28-2, whether the damping-control starting condition is established is determined. If the damping-control-starting-condition is established, the process is advanced to Step S28-3, and if it is not established, the process is advanced to Step S28-5.

In Step S28-3, the damping-control-process is performed. In Step S28-4, whether the damping-control-finishing condition is established is evaluated. If the damping-control finish conditions are established, the process is advanced to Step S28-5, and if it is not established, the process is returned to Step S28-3.

In Step S28-5, the damping-control-process is not performed, and the process is returned.

The invention is not limited to the above embodiment, and can be variously modified consistent with the purport of the invention, and is not intended to exclude them from the scope of the invention.

What is claimed is:

1. A drive-control-system of an electromotive vehicle having comprising:
   a vehicle-drive system comprising a driving motor mechanically linked with a driving wheel;
   a position sensor detecting a rotor position that is a position of a rotor of the driving motor;
   a driving-motor-angular acceleration calculation-process unit calculating an angular acceleration of the rotor based on the rotor position detected by the position sensor;
   a damping-control-process unit controlling the driving motor such that the angular acceleration of the rotor becomes zero;
   a condition-determination-process unit that reads a vibration index as a factor causing vibration in the vehicle-drive-system, and determines whether a damping-control-starting-condition is established based on the vibration index; and
   the damping-control-process unit that performs a damping control process when the damping-control-starting-condition is established and that prohibits the damping control process when the damping-control-starting condition is not established.

2. The drive-control-system of the electromotive vehicle according to claim 1, wherein the damping-control-process unit comprises a vibration-generation-variable calculation-process unit that calculates a variable of vibration generation that appears with vibration generated in the vehicle-drive-system, and performs the damping control process based on the variable of vibration generation calculated by the vibration-generation-variable calculation-process unit.

3. The drive-control-system of the electromotive vehicle according to claim 2, wherein the damping-control-process unit reduces the variable of vibration generation by controlling the driving motor.

4. The drive-control-system of the electromotive vehicle according to claim 2, wherein the vibration index is variation of input torque or output torque in the vehicle-drive-system, or a predetermined instruction causing the variation.

5. The drive-control-system of the electromotive vehicle according to claim 4, wherein the vibration index is an instruction for engaging/disengaging a generator brake.

6. The drive-control-system of the electromotive vehicle according to claim 4, wherein the vibration index is an instruction for turning on/off auxiliary equipment.

7. The drive-control-system of the electromotive vehicle according to claim 4, wherein the vibration index is a percentage of change of rotation speed of a predetermined drive source.

8. The drive-control-system of the electromotive vehicle according to claim 4, wherein the vibration index is a percentage of change of an operation level of a driver for accelerating/decelerating a vehicle.

9. The drive-control-system of the electromotive vehicle according to claim 4, wherein the variable of vibration generation is angular acceleration of the driving motor.

10. The drive-control-system of the electromotive vehicle according to claim 9, further comprising a driving-motor-target-torque calculation-process unit that estimates driving-shaft-torque when the generator is driven based on generator-target-torque and inertia torque of the generator, and calculates driving-motor target torque based on a vehicle-request-torque required for running the vehicle and the driving-shaft-torque, wherein the driving-motor-target-torque calculation-process unit estimates the driving-shaft-torque based on inertia torque of the driving motor calculated based on generator-target-torque, inertia torque of the generator, and the angular acceleration.

11. The drive-control-system of the electromotive vehicle according to claim 1, further comprising a generator, the driving motor, and a differential tuning gear, wherein the differential tuning gear has a first differential element linked with the generator, a second differential element linked with the driving motor, and a third differential element linked with an engine.

12. A drive-control-method of an electromotive vehicle, comprising:
    reading a vibration index as a factor causing vibration in a vehicle-drive-system,
    determining whether a damping-control-starting-condition is established based on the vibration index, and
    performing a damping control process such that a variable of vibration generation is reduced when the damping-control-starting-condition is established.

13. A drive-control-system of an electromotive vehicle having comprising:
    a condition-determination-process unit that reads a vibration index as a factor causing vibration in a vehicle-drive-system, and determines whether a damping-control-starting-condition is established based on the vibration index;
    a damping-control-process unit that performs a damping control process such that a variable of vibration generation is reduced when the damping-control-starting-condition is established; wherein the vibration index is variation of input torque or output torque in the vehicle-drive-system, or a predetermined instruction causing the variation; and a driving-motor-target-torque calculation-process unit that estimates driving-shaft-torque when the generator is driven based on generator-target-torque and inertia torque of the generator, and calculates driving-motor target torque based on a vehicle-request-torque required for running the vehicle and the driving-shaft-torque, wherein the driving-motor-target-torque calculation-process unit estimates the driving-shaft-torque based on inertia torque of the driving motor calculated based on generator-target-torque, inertia torque of the generator, and the angular acceleration.

14. A drive-control-system of an electromotive vehicle having comprising:

a condition-determination-process unit that reads a vibration index as a factor causing vibration in a vehicle-drive-system, and determines whether a damping-control-starting-condition is established based on the vibration index;

a damping-control-process unit that performs a damping control process such that a variable of vibration generation is reduced when the damping-control-starting-condition is established; and a generator, the driving motor, and a differential tuning gear, wherein the differential tuning gear has a first differential element linked with the generator, a second differential element linked with the driving motor, and a third differential element linked with an engine.

* * * * *